United States Patent [19]
Cai

[11] Patent Number: 5,572,220
[45] Date of Patent: Nov. 5, 1996

[54] TECHNIQUE TO DETECT ANGLE OF ARRIVAL WITH LOW AMBIGUITY

[75] Inventor: Khiem V. Cai, Brea, Calif.

[73] Assignee: Hughes Aircraft Company, Los Angeles, Calif.

[21] Appl. No.: 443,537

[22] Filed: May 18, 1995

[51] Int. Cl.⁶ ..................................................... G01S 5/04
[52] U.S. Cl. ........................................ 342/442; 342/424
[58] Field of Search ................................... 342/442, 424, 342/423

[56] References Cited

U.S. PATENT DOCUMENTS

| 4,734,702 | 3/1988 | Kaplan ........................................ 342/424 |
| 4,912,475 | 3/1990 | Counselman, III ......................... 342/352 |

*Primary Examiner*—Gregory C. Issing
*Attorney, Agent, or Firm*—Michael W. Sales; Wanda K. Denson-Low

[57] ABSTRACT

An angle-of-arrival (AOA) phase unwrapping technique using a trellis search to determine the correct AOA. An antenna array having several elements arranged to establish several baselines (element spacings) between different pairs of elements receives RF signals, ranging from 1/2 λ to multiples of 1/2 λ. The search starts from the smallest baseline to determine the unambiguous unwrapped phase. From this least unambiguous unwrapped phase, the process then searches for the closest unwrapped phase on the second smallest baseline, eliminating the ambiguity, and improving the accuracy. As the search processes the larger baselines, the accuracy is increased, while controlling the ambiguity. As a result, the largest baseline yields the most accurate and unambiguous AOA, and results in maximum likelihood estimation of AOA.

16 Claims, 16 Drawing Sheets

Table 1. Compute α based on equation 7 (420 or 440)

$\Delta\phi_{k(x)} = 2/2 \longrightarrow$

| $\Delta\theta_{k(x-1)}$ ↓ | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0   | 0    | 10   | 20   | 30   | 40   | 50   | 60   | 70   | 80   | 90   | 100  | 110  | 120  | 130  | 140  | 150  | 160  | 170  |
| 20  | -20  | -10  | 0    | 10   | 20   | 30   | 40   | 50   | 60   | 70   | 80   | 90   | 100  | 110  | 120  | 130  | 140  | 150  |
| 40  | -40  | -30  | -20  | -10  | 0    | 10   | 20   | 30   | 40   | 50   | 60   | 70   | 80   | 90   | 100  | 110  | 120  | 130  |
| 60  | -60  | -50  | -40  | -30  | -20  | -10  | 0    | 10   | 20   | 30   | 40   | 50   | 60   | 70   | 80   | 90   | 100  | 110  |
| 80  | -80  | -70  | -60  | -50  | -40  | -30  | -20  | -10  | 0    | 10   | 20   | 30   | 40   | 50   | 60   | 70   | 80   | 90   |
| 100 | -100 | -90  | -80  | -70  | -60  | -50  | -40  | -30  | -20  | -10  | 0    | 10   | 20   | 30   | 40   | 50   | 60   | 70   |
| 120 | -120 | -110 | -100 | -90  | -80  | -70  | -60  | -50  | -40  | -30  | -20  | -10  | 0    | 10   | 20   | 30   | 40   | 50   |
| 140 | -140 | -130 | -120 | -110 | -100 | -90  | -80  | -70  | -60  | -50  | -40  | -30  | -20  | -10  | 0    | 10   | 20   | 30   |
| 160 | -160 | -150 | -140 | -130 | -120 | -110 | -100 | -90  | -80  | -70  | -60  | -50  | -40  | -30  | -20  | -10  | 0    | 10   |
| 180 | -180 | -170 | -160 | -150 | -140 | -130 | -120 | -110 | -100 | -90  | -80  | -70  | -60  | -50  | -40  | -30  | -20  | -10  |
| 200 | -200 | -190 | -180 | -170 | -160 | -150 | -140 | -130 | -120 | -110 | -100 | -90  | -80  | -70  | -60  | -50  | -40  | -30  |
| 220 | -220 | -210 | -200 | -190 | -180 | -170 | -160 | -150 | -140 | -130 | -120 | -110 | -100 | -90  | -80  | -70  | -60  | -50  |
| 240 | -240 | -230 | -220 | -210 | -200 | -190 | -180 | -170 | -160 | -150 | -140 | -130 | -120 | -110 | -100 | -90  | -80  | -70  |
| 260 | -260 | -250 | -240 | -230 | -220 | -210 | -200 | -190 | -180 | -170 | -160 | -150 | -140 | -130 | -120 | -110 | -100 | -90  |
| 280 | -280 | -270 | -260 | -250 | -240 | -230 | -220 | -210 | -200 | -190 | -180 | -170 | -160 | -150 | -140 | -130 | -120 | -110 |
| 300 | -300 | -290 | -280 | -270 | -260 | -250 | -240 | -230 | -220 | -210 | -200 | -190 | -180 | -170 | -160 | -150 | -140 | -130 |
| 320 | -320 | -310 | -300 | -290 | -280 | -270 | -260 | -250 | -240 | -230 | -220 | -210 | -200 | -190 | -180 | -170 | -160 | -150 |
| 340 | -340 | -330 | -320 | -310 | -300 | -290 | -280 | -270 | -260 | -250 | -240 | -230 | -220 | -210 | -200 | -190 | -180 | -170 |

FIG. 12

Table 2. Compute m based on equation 6 (422 or 442)

$\Delta\phi_{k(x)} = 2l/2 \longrightarrow$ $\Delta\theta_{k(x-1)} \longrightarrow$

| | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0   | 0 | 0 | 0 | 0 | 0 | 0 | 0 | 0 | 0 | 1 | 1 | 1 | 1 | 1 | 1 | 1 | 1 | 1 |
| 20  | 0 | 0 | 0 | 0 | 0 | 0 | 0 | 0 | 0 | 0 | 1 | 1 | 1 | 1 | 1 | 1 | 1 | 1 |
| 40  | 0 | 0 | 0 | 0 | 0 | 0 | 0 | 0 | 0 | 0 | 0 | 1 | 1 | 1 | 1 | 1 | 1 | 1 |
| 60  | 0 | 0 | 0 | 0 | 0 | 0 | 0 | 0 | 0 | 0 | 0 | 0 | 1 | 1 | 1 | 1 | 1 | 1 |
| 80  | 0 | 0 | 0 | 0 | 0 | 0 | 0 | 0 | 0 | 0 | 0 | 0 | 0 | 1 | 1 | 1 | 1 | 1 |
| 100 | 1 | 0 | 0 | 0 | 0 | 0 | 0 | 0 | 0 | 0 | 0 | 0 | 0 | 0 | 1 | 1 | 1 | 1 |
| 120 | 1 | 1 | 0 | 0 | 0 | 0 | 0 | 0 | 0 | 0 | 0 | 0 | 0 | 0 | 0 | 1 | 1 | 1 |
| 140 | 1 | 1 | 1 | 0 | 0 | 0 | 0 | 0 | 0 | 0 | 0 | 0 | 0 | 0 | 0 | 0 | 1 | 1 |
| 160 | 1 | 1 | 1 | 1 | 0 | 0 | 0 | 0 | 0 | 0 | 0 | 0 | 0 | 0 | 0 | 0 | 0 | 1 |
| 180 | 1 | 1 | 1 | 1 | 1 | 1 | 0 | 0 | 0 | 0 | 0 | 0 | 0 | 0 | 0 | 0 | 0 | 0 |
| 200 | 1 | 1 | 1 | 1 | 1 | 1 | 1 | 0 | 0 | 0 | 0 | 0 | 0 | 0 | 0 | 0 | 0 | 0 |
| 220 | 1 | 1 | 1 | 1 | 1 | 1 | 1 | 1 | 0 | 0 | 0 | 0 | 0 | 0 | 0 | 0 | 0 | 0 |
| 240 | 1 | 1 | 1 | 1 | 1 | 1 | 1 | 1 | 1 | 0 | 0 | 0 | 0 | 0 | 0 | 0 | 0 | 0 |
| 260 | 0 | 1 | 1 | 1 | 1 | 1 | 1 | 1 | 1 | 1 | 0 | 0 | 0 | 0 | 0 | 0 | 0 | 0 |
| 280 | 0 | 0 | 1 | 1 | 1 | 1 | 1 | 1 | 1 | 1 | 1 | 1 | 1 | 1 | 1 | 1 | 1 | 1 |
| 300 | 0 | 0 | 0 | 1 | 0 | 1 | 1 | 1 | 1 | 1 | 1 | 1 | 1 | 1 | 1 | 1 | 1 | 1 |
| 320 | 0 | 0 | 0 | 0 | 0 | 0 | 1 | 1 | 1 | 1 | 1 | 1 | 1 | 1 | 1 | 1 | 1 | 1 |
| 340 | 0 | 0 | 0 | 0 | 0 | 0 | 0 | 1 | 1 | 1 | 1 | 1 | 1 | 1 | 1 | 1 | 1 | 1 |

FIG. 13

Table 3. Compute $\Delta\theta_{k(x)=2/2}$ based on equation 8 (424 or 444)

$\Delta\phi_{k(x)=2/2} \rightarrow$ $\Delta\theta_{k(x-1)} \downarrow$

| | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0 | 0 | 10 | 20 | 30 | 40 | 50 | 60 | 70 | 80 | -90 | -80 | -70 | -60 | -50 | -40 | -30 | -20 | -10 |
| 20 | 0 | 10 | 20 | 30 | 40 | 50 | 60 | 70 | 80 | 90 | -80 | -70 | -60 | -50 | -40 | -30 | -20 | -10 |
| 40 | 0 | 10 | 20 | 30 | 40 | 50 | 60 | 70 | 80 | 90 | 100 | -70 | -60 | -50 | -40 | -30 | -20 | -10 |
| 60 | 0 | 10 | 20 | 30 | 40 | 50 | 60 | 70 | 80 | 90 | 100 | 110 | -60 | -50 | -40 | -30 | -20 | -10 |
| 80 | 0 | 10 | 20 | 30 | 40 | 50 | 60 | 70 | 80 | 90 | 100 | 110 | 120 | -50 | -40 | -30 | -20 | -10 |
| 100 | -180 | 10 | 20 | 30 | 40 | 50 | 60 | 70 | 80 | 90 | 100 | 110 | 120 | 130 | -40 | -30 | -20 | 170 |
| 120 | -180 | -170 | 20 | 30 | 40 | 50 | 60 | 70 | 80 | 90 | 100 | 110 | 120 | 130 | 140 | -30 | 160 | 170 |
| 140 | -180 | -170 | -160 | 30 | 40 | 50 | 60 | 70 | 80 | 90 | 100 | 110 | 120 | 130 | 140 | 150 | 160 | 170 |
| 160 | -180 | -170 | -160 | -150 | 40 | 50 | 60 | 70 | 80 | 90 | 100 | 110 | 120 | 130 | 140 | 150 | 160 | 170 |
| 180 | -180 | -170 | -160 | -150 | -140 | 50 | 60 | 70 | 80 | 90 | 100 | 110 | 120 | 130 | 140 | 150 | 160 | 170 |
| 200 | -180 | -170 | -160 | -150 | -140 | -130 | 60 | 70 | 80 | 90 | 100 | 110 | 120 | 130 | 140 | 150 | 160 | 170 |
| 220 | -180 | -170 | -160 | -150 | -140 | -130 | -120 | 70 | 80 | 90 | 100 | 110 | 120 | 130 | 140 | 150 | 160 | 170 |
| 240 | -180 | -170 | -160 | -150 | -140 | -130 | -120 | -110 | 80 | 90 | 100 | 110 | 120 | 130 | 140 | 150 | 160 | 170 |
| 260 | -180 | -170 | -160 | -150 | -140 | -130 | -120 | -110 | -100 | 90 | 100 | 110 | 120 | 130 | 140 | 150 | 160 | 170 |
| 280 | 0 | -170 | -160 | -150 | -140 | -130 | -120 | -110 | -100 | -90 | -80 | -70 | -60 | -50 | -40 | 150 | 160 | 170 |
| 300 | 0 | 10 | -160 | -150 | -140 | -130 | -120 | -110 | -100 | -90 | -80 | -70 | -60 | -50 | -40 | -30 | 160 | 170 |
| 320 | 0 | 10 | 20 | -150 | -140 | -130 | -120 | -110 | -100 | -90 | -80 | -70 | -60 | -50 | -40 | -30 | -20 | -10 |
| 340 | 0 | 10 | 20 | 30 | 40 | 50 | 60 | -110 | -100 | -90 | -80 | -70 | -60 | -50 | -40 | -30 | -20 | -10 |

FIG. 14

Table 4. Compute å based on equation 9 (446) if k(n)=2/2 is the longest baseline $\Delta\phi_{k(n)=2/2} \longrightarrow$ $\Delta\theta_{k(n-1)} \downarrow$

| | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0 | 90 | 86.8 | 83.6 | 80.4 | 77.2 | 73.9 | 70.5 | 67.1 | 63.6 | 120 | 116 | 113 | 110 | 106 | 103 | 99.6 | 96.4 | 93.2 |
| 20 | 90 | 86.8 | 83.6 | 80.4 | 77.2 | 73.9 | 70.5 | 67.1 | 63.6 | 60 | 56.3 | 113 | 110 | 106 | 103 | 99.6 | 96.4 | 93.2 |
| 40 | 90 | 86.8 | 83.6 | 80.4 | 77.2 | 73.9 | 70.5 | 67.1 | 63.6 | 60 | 56.3 | 52.3 | 110 | 106 | 103 | 99.6 | 96.4 | 93.2 |
| 60 | 90 | 86.8 | 83.6 | 80.4 | 77.2 | 73.9 | 70.5 | 67.1 | 63.6 | 60 | 56.3 | 52.3 | 48.2 | 106 | 103 | 99.6 | 96.4 | 93.2 |
| 80 | 90 | 86.8 | 83.6 | 80.4 | 77.2 | 73.9 | 70.5 | 67.1 | 63.6 | 60 | 56.3 | 52.3 | 48.2 | 43.8 | 103 | 99.6 | 96.4 | 93.2 |
| 100 | 180 | 86.8 | 83.6 | 80.4 | 77.2 | 73.9 | 70.5 | 67.1 | 63.6 | 60 | 56.3 | 52.3 | 48.2 | 43.8 | 38.9 | 33.6 | 27.3 | 19.2 |
| 120 | 180 | 161 | 153 | 146 | 141 | 136 | 132 | 128 | 124 | 60 | 56.3 | 52.3 | 48.2 | 43.8 | 38.9 | 33.6 | 27.3 | 19.2 |
| 140 | 180 | 161 | 153 | 146 | 141 | 136 | 132 | 128 | 124 | 60 | 56.3 | 52.3 | 48.2 | 43.8 | 38.9 | 33.6 | 27.3 | 19.2 |
| 160 | 180 | 161 | 153 | 146 | 141 | 136 | 132 | 128 | 124 | 60 | 56.3 | 52.3 | 48.2 | 43.8 | 38.9 | 33.6 | 27.3 | 19.2 |
| 180 | 180 | 161 | 153 | 146 | 141 | 136 | 132 | 128 | 124 | 60 | 56.3 | 52.3 | 48.2 | 43.8 | 38.9 | 33.6 | 27.3 | 19.2 |
| 200 | 180 | 161 | 153 | 146 | 141 | 136 | 132 | 128 | 124 | 120 | 56.3 | 52.3 | 48.2 | 43.8 | 38.9 | 33.6 | 27.3 | 19.2 |
| 220 | 180 | 161 | 153 | 146 | 141 | 136 | 132 | 128 | 124 | 120 | 116 | 52.3 | 48.2 | 43.8 | 38.9 | 33.6 | 27.3 | 19.2 |
| 240 | 180 | 161 | 153 | 146 | 141 | 136 | 132 | 128 | 124 | 120 | 116 | 113 | 48.2 | 43.8 | 38.9 | 33.6 | 27.3 | 19.2 |
| 260 | 180 | 161 | 153 | 146 | 141 | 136 | 132 | 128 | 124 | 120 | 116 | 113 | 110 | 43.8 | 38.9 | 33.6 | 27.3 | 19.2 |
| 280 | 90 | 86.8 | 83.6 | 80.4 | 77.2 | 73.9 | 70.5 | 67.1 | 63.6 | 120 | 116 | 113 | 110 | 106 | 103 | 99.6 | 96.4 | 93.2 |
| 300 | 90 | 86.8 | 83.6 | 80.4 | 77.2 | 73.9 | 70.5 | 67.1 | 63.6 | 120 | 116 | 113 | 110 | 106 | 103 | 99.6 | 96.4 | 93.2 |
| 320 | 90 | 86.8 | 83.6 | 80.4 | 77.2 | 73.9 | 70.5 | 67.1 | 63.6 | 120 | 116 | 113 | 110 | 106 | 103 | 99.6 | 96.4 | 93.2 |
| 340 | 90 | 86.8 | 83.6 | 80.4 | 77.2 | 73.9 | 70.5 | 67.1 | 63.6 | 120 | 116 | 113 | 110 | 106 | 103 | 99.6 | 96.4 | 93.2 |

FIG. 15

Table 450. Compute $\Delta\theta_{k(x)=2/2}$ based on equation 8 (424 or 444)

$\Delta\phi_{k(x)=2/2} \longrightarrow$ $\Delta\theta_{k(x-1)} \downarrow$

| | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0 | 0 | 10 | 20 | 30 | 40 | 50 | 60 | 70 | 80 | -90 | -80 | -70 | -60 | -50 | -40 | -30 | -20 | -10 |
| 20 | -10 | 0 | 10 | 20 | 30 | 40 | 50 | 60 | 70 | 80 | -90 | -80 | -70 | -60 | -50 | -40 | -30 | -20 |
| 40 | -20 | -10 | 0 | 10 | 20 | 30 | 40 | 50 | 60 | 70 | 80 | -90 | -80 | -70 | -60 | -50 | -40 | -30 |
| 60 | -30 | -20 | -10 | 0 | 10 | 20 | 30 | 40 | 50 | 60 | 70 | 80 | -90 | -80 | -70 | -60 | -50 | -40 |
| 80 | -40 | -30 | -20 | -10 | 0 | 10 | 20 | 30 | 40 | 50 | 60 | 70 | 80 | -90 | -80 | -70 | -60 | -50 |
| 100 | -50 | -40 | -30 | -20 | -10 | 0 | 10 | 20 | 30 | 40 | 50 | 60 | 70 | 80 | -90 | -80 | -70 | -60 |
| 120 | -60 | -50 | -40 | -30 | -20 | -10 | 0 | 10 | 20 | 30 | 40 | 50 | 60 | 70 | 80 | -90 | -80 | -70 |
| 140 | -70 | -60 | -50 | -40 | -30 | -20 | -10 | 0 | 10 | 20 | 30 | 40 | 50 | 60 | 70 | 80 | -90 | -80 |
| 160 | -80 | -70 | -60 | -50 | -40 | -30 | -20 | -10 | 0 | 10 | 20 | 30 | 40 | 50 | 60 | 70 | 80 | -90 |
| 180 | -90 | -80 | -70 | -60 | -50 | -40 | -30 | -20 | -10 | 0 | 10 | 20 | 30 | 40 | 50 | 60 | 70 | 80 |
| 200 | 80 | -90 | -80 | -70 | -60 | -50 | -40 | -30 | -20 | -10 | 0 | 10 | 20 | 30 | 40 | 50 | 60 | 70 |
| 220 | 70 | 80 | -90 | -80 | -70 | -60 | -50 | -40 | -30 | -20 | -10 | 0 | 10 | 20 | 30 | 40 | 50 | 60 |
| 240 | 60 | 70 | 80 | -90 | -80 | -70 | -60 | -50 | -40 | -30 | -20 | -10 | 0 | 10 | 20 | 30 | 40 | 50 |
| 260 | 50 | 60 | 70 | 80 | -90 | -80 | -70 | -60 | -50 | -40 | -30 | -20 | -10 | 0 | 10 | 20 | 30 | 40 |
| 280 | 40 | 50 | 60 | 70 | 80 | -90 | -80 | -70 | -60 | -50 | -40 | -30 | -20 | -10 | 0 | 10 | 20 | 30 |
| 300 | 30 | 40 | 50 | 60 | 70 | 80 | -90 | -80 | -70 | -60 | -50 | -40 | -30 | -20 | -10 | 0 | 10 | 20 |
| 320 | 20 | 30 | 40 | 50 | 60 | 70 | 80 | -90 | -80 | -70 | -60 | -50 | -40 | -30 | -20 | -10 | 0 | 10 |
| 340 | 10 | 20 | 30 | 40 | 50 | 60 | 70 | 80 | -90 | -80 | -70 | -60 | -50 | -40 | -30 | -20 | -10 | 0 |

FIG. 17

Table 452. Compute $\Delta\theta_{k(x)=5/2}$ based on equation 8 (424 or 444)

$\Delta\theta_{k(x-1)}$ (rows) vs $\Delta\phi_{k(x)=5/2}$ (columns)

| $\Delta\theta$ \ $\Delta\phi$ | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0 | 0 | 4 | 8 | 12 | 16 | 20 | 24 | 28 | 32 | -36 | -32 | -28 | -24 | -20 | -16 | -12 | -8 | -4 |
| 20 | 0 | 4 | 8 | 12 | 16 | 20 | 24 | 28 | 32 | 36 | -32 | -28 | -24 | -20 | -16 | -12 | -8 | -4 |
| 40 | 72 | 76 | 80 | 84 | 88 | 92 | 96 | 100 | 104 | 36 | 40 | 44 | 48 | 52 | 56 | 60 | 64 | 68 |
| 60 | 72 | 76 | 80 | 84 | 88 | 92 | 96 | 100 | 104 | 36 | 40 | 44 | 48 | 52 | 56 | 60 | 64 | 68 |
| 80 | 72 | 76 | 80 | 84 | 88 | 92 | 96 | 100 | 104 | 36 | 40 | 44 | 48 | 52 | 56 | 60 | 64 | 68 |
| 100 | 72 | 76 | 80 | 84 | 88 | 92 | 96 | 100 | 104 | 108 | 112 | 116 | 120 | 124 | 128 | 132 | 136 | 140 |
| 120 | 144 | 148 | 152 | 156 | 160 | 164 | 168 | 172 | 176 | 108 | 112 | 116 | 120 | 124 | 128 | 132 | 136 | 140 |
| 140 | 144 | 148 | 152 | 156 | 160 | 164 | 168 | 172 | 176 | 108 | 112 | 116 | 120 | 124 | 128 | 132 | 136 | 140 |
| 160 | 144 | 148 | 152 | 156 | 160 | 164 | 168 | 172 | 176 | 108 | 112 | 116 | 120 | 124 | 128 | 132 | 136 | 140 |
| 180 | 144 | 148 | 152 | 156 | 160 | 164 | 168 | 172 | 176 | -180 | -176 | -172 | -168 | -164 | -160 | -156 | -152 | -148 |
| 200 | -144 | -140 | -136 | -132 | -128 | -124 | -120 | -116 | -112 | -180 | -176 | -172 | -168 | -164 | -160 | -156 | -152 | -148 |
| 220 | -144 | -140 | -136 | -132 | -128 | -124 | -120 | -116 | -112 | -180 | -176 | -172 | -168 | -164 | -160 | -156 | -152 | -148 |
| 240 | -144 | -140 | -136 | -132 | -128 | -124 | -120 | -116 | -112 | -180 | -176 | -172 | -168 | -164 | -160 | -156 | -152 | -148 |
| 260 | -144 | -68 | -64 | -60 | -56 | -52 | -48 | -44 | -40 | -108 | -104 | -100 | -96 | -92 | -88 | -84 | -80 | -76 |
| 280 | -72 | -68 | -64 | -60 | -56 | -52 | -48 | -44 | -40 | -108 | -104 | -100 | -96 | -92 | -88 | -84 | -80 | -76 |
| 300 | -72 | -68 | -64 | -60 | -56 | -52 | -48 | -44 | -40 | -108 | -104 | -100 | -96 | -92 | -88 | -84 | -80 | -76 |
| 320 | -72 | -68 | -64 | -60 | -56 | -52 | -48 | -44 | -40 | -36 | -32 | -28 | -24 | -20 | -16 | -12 | -8 | -76 |
| 340 | 0 | 4 | 8 | 12 | 8 | -52 | -48 | -44 | -40 | -36 | -32 | -28 | -24 | -20 | -16 | -12 | -8 | -4 |

FIG. 18

Table 456. Compute â based on equation 9 (446) if k(n)=5/2 is the longest baseline $\Delta\phi_{k(n)=5/2} \rightarrow$

| $\Delta\theta_{k(n-1)}$ | 0 | 20 | 40 | 60 | 80 | 100 | 120 | 140 | 160 | 180 | 200 | 220 | 240 | 260 | 280 | 300 | 320 | 340 |
|---|---|---|---|---|---|---|---|---|---|---|---|---|---|---|---|---|---|---|
| 0 | 90 | 88.7 | 87.5 | 86.2 | 84.9 | 83.6 | 82.3 | 81.1 | 79.8 | 102 | 100 | 98.9 | 97.7 | 96.4 | 95.1 | 93.8 | 92.5 | 91.3 |
| 20 | 90 | 88.7 | 87.5 | 86.2 | 84.9 | 83.6 | 82.3 | 81.1 | 79.8 | 78.5 | 77.2 | 75.9 | 74.5 | 73.2 | 95.1 | 93.8 | 92.5 | 91.3 |
| 40 | 66.4 | 88.7 | 87.5 | 86.2 | 84.9 | 83.6 | 82.3 | 81.1 | 79.8 | 78.5 | 77.2 | 75.9 | 74.5 | 73.2 | 71.9 | 70.5 | 69.2 | 67.8 |
| 60 | 66.4 | 65 | 63.6 | 62.2 | 60.7 | 59.3 | 57.8 | 56.3 | 54.7 | 53.1 | 51.5 | 49.9 | 48.2 | 73.2 | 71.9 | 70.5 | 69.2 | 67.8 |
| 80 | 66.4 | 65 | 63.6 | 62.2 | 60.7 | 59.3 | 57.8 | 56.3 | 54.7 | 53.1 | 51.5 | 49.9 | 48.2 | 46.5 | 44.7 | 42.8 | 40.9 | 38.9 |
| 100 | 66.4 | 65 | 63.6 | 62.2 | 60.7 | 59.3 | 57.8 | 56.3 | 54.7 | 53.1 | 51.5 | 49.9 | 48.2 | 46.5 | 44.7 | 42.8 | 40.9 | 38.9 |
| 120 | 36.8 | 34.7 | 32.4 | 29.9 | 27.3 | 24.3 | 21 | 17.1 | 12.1 | 180 | 168 | 163 | 159 | 156 | 153 | 150 | 148 | 145 |
| 140 | 36.8 | 34.7 | 32.4 | 29.9 | 27.3 | 24.3 | 21 | 17.1 | 12.1 | 180 | 168 | 163 | 159 | 156 | 153 | 150 | 148 | 145 |
| 160 | 36.8 | 34.7 | 32.4 | 29.9 | 27.3 | 24.3 | 21 | 17.1 | 12.1 | 180 | 168 | 163 | 159 | 156 | 153 | 150 | 148 | 145 |
| 180 | 36.8 | 34.7 | 141 | 137 | 135 | 134 | 132 | 130 | 128 | 127 | 125 | 124 | 122 | 121 | 119 | 118 | 116 | 115 |
| 200 | 143 | 141 | 139 | 137 | 135 | 134 | 132 | 130 | 128 | 127 | 125 | 124 | 122 | 121 | 119 | 118 | 116 | 115 |
| 220 | 143 | 141 | 139 | 137 | 135 | 134 | 132 | 130 | 128 | 127 | 125 | 124 | 122 | 121 | 119 | 118 | 116 | 115 |
| 240 | 143 | 141 | 139 | 137 | 135 | 134 | 132 | 130 | 128 | 127 | 125 | 124 | 122 | 121 | 119 | 118 | 116 | 115 |
| 260 | 114 | 112 | 111 | 109 | 108 | 107 | 105 | 104 | 103 | 102 | 100 | 98.9 | 97.7 | 96.4 | 95.1 | 93.8 | 92.5 | 91.3 |
| 280 | 114 | 112 | 111 | 109 | 108 | 107 | 105 | 104 | 103 | 102 | 100 | 98.9 | 97.7 | 96.4 | 95.1 | 93.8 | 92.5 | 91.3 |
| 300 | 114 | 112 | 111 | 109 | 108 | 107 | 105 | 104 | 103 | 102 | 100 | 98.9 | 97.7 | 96.4 | 95.1 | 93.8 | 92.5 | 91.3 |
| 320 | 114 | 112 | 87.5 | 86.2 | 108 | 107 | 105 | 104 | 103 | 102 | 100 | 98.9 | 97.7 | 96.4 | 95.1 | 93.8 | 92.5 | 115 |
| 340 | 90 | 88.7 | 87.5 | 86.2 | 108 | 107 | 105 | 104 | 103 | 102 | 100 | 98.9 | 97.7 | 96.4 | 95.1 | 93.8 | 92.5 | 91.3 |

FIG. 19

TECHNIQUE TO DETECT ANGLE OF ARRIVAL WITH LOW AMBIGUITY

TECHNICAL FIELD OF THE INVENTION

This invention relates to direction finding systems employing Angle-of Arrival (AOA) processing.

1. Background of the Invention

Classical direction finding systems use antenna arrays to determine the AOA of the signal source. But to accurately determine the AOA, the received signal at the antenna elements must be processed to eliminate ambiguity and decrease the effect of electrical phase errors.

The problem has been addressed in the report "Ambiguity-Resistant Three- and Four-Channel Interferometers," by Robert L. Goodwin, NRL Report 8005, Sep. 9, 1976. The technique described in this report is very sensitive to interference and multi paths.

2. Summary of the Invention

The AOA unwrapping technique uses the trellis search to determine the correct AOA. The search starts from the smallest baseline to determine the unambiguous unwrapped phase. From this least unambiguous unwrapped phase, the process then searches for the closest unwrapped phase on the second smallest baseline, eliminating the ambiguity, and improving the accuracy. As the search processed the larger baselines, the accuracy is increased, while controlling the ambiguity. As a result, the largest baseline yields the most accurate and unambiguous AOA. Since this processing is a trellis search, it results in maximum likelihood estimation of AOA.

For baselines longer than $\lambda/2$, phase ambiguity will occur. The invention technique is a trellis search, that searches for the shortest path from the smallest baseline to the largest baseline. This technique alleviates the ambiguity estimation of the AOA, and provides high AOA accuracy estimating against noise and interference.

BRIEF DESCRIPTION OF THE DRAWING

These and other features and advantages of the present invention will become more apparent from the following detailed description of an exemplary embodiment thereof, as illustrated in the accompanying drawings, in which:

FIG. 12 shows an exemplary lookup table of the values $\alpha$ calculated in the manner shown in FIG. 10.

FIG. 13 shows an exemplary lookup table of the values m calculated in the manner shown in FIG. 10.

FIG. 14 shows an exemplary lookup table of the values $\Delta\theta$ calculated in the manner shown in FIG. 10.

FIG. 15 shows an exemplary lookup table of AOA values calculated in the manner shown in FIG. 11.

FIG. 17 shows an exemplary lookup table of $\Delta\theta_{Table\ 1}$ values used in the implementation of FIG. 16.

FIG. 18 shows an exemplary lookup table of $\Delta\theta_{Table\ 2}$ values used in the implementation of FIG. 16.

FIG. 19 is an exemplary lookup table of AOA values resulting in the implementation of FIG. 16.

DETAILED DESCRIPTION OF THE PREFERRED EMBODIMENT

The Angle of Arrival is generally computed based on the phase difference between two elements of an antenna. In practical applications, direction finding antennas have many elements that constitute numerous baselines, i.e., pairs of elements, for controlling ambiguity and increasing AOA accuracy. Each baseline has a baseline factor k(i) defined as the ratio of the element-to-element spacing to the received signal wavelength. The smallest baseline is generally selected to have a factor $k(1)=1/2$ so that an unambiguous solution of the angle of arrival can be obtained. However, this baseline is most sensitive to noise. On the other hand, larger baselines having factors $k(n)>>1$ are used to reduce AOA error, but these baselines have ambiguous AOA solutions. Thus, the antenna baselines that are used in the system must be carefully selected to minimize ambiguity and sensitivity to noise.

Figure 1:
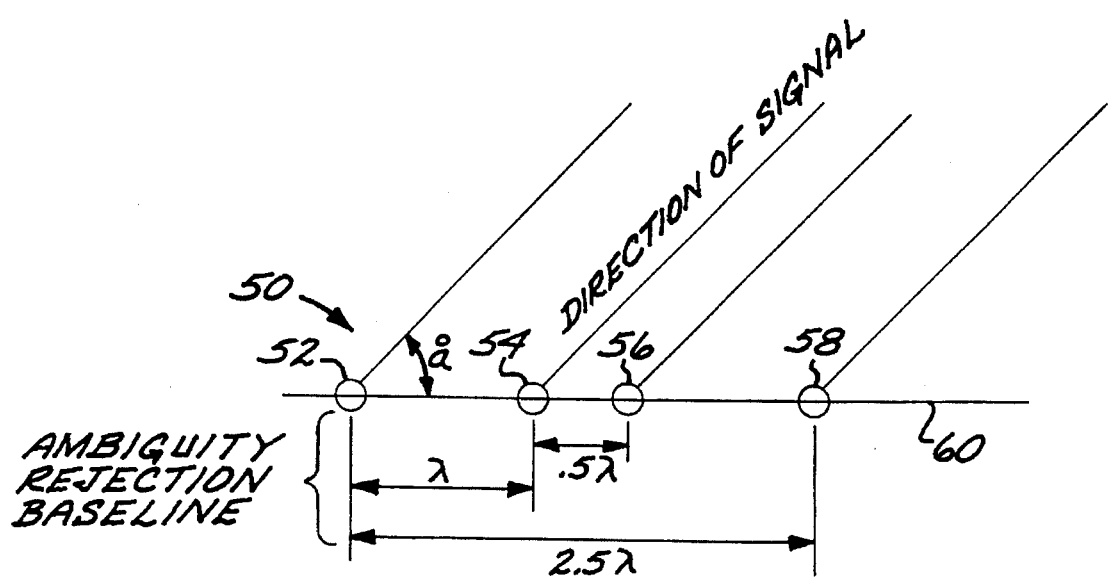
FIG. 1 is a exemplary generalized antenna array employed for AOA detection.

FIG. 1 shows an exemplary AOA system 50 with several elements 52, 54, 56 and 58. Pairs of the antenna elements are selected to establish n baselines. These baselines are ordered from the smallest length (element spacing) to the longest length: d(1), d(2), . . . (d)n).

$$d(x)=k(x)\lambda$$

where $\lambda$ is the waveform wavelength and k(x) is defined as the baseline factor of baseline x.

Let â be the angle of arrival measured from the antenna axis 60. The phase difference between the two antenna elements of baseline x, $\Delta\phi_{k(x)}$, is expressed as $$\Delta\phi_{k(x)}=2\pi k(x) \cos (â) \tag{1}$$

If the phase difference $\Delta\phi_{k(x)}$ between the two antenna elements can be measured, the AOA corresponding to baseline x is expressed as $$\dot{a}_{k(x)} = a\cos\left(\frac{\Delta\phi_{k(x)} + m \cdot 2\pi}{2\pi k(x)}\right) = a\cos\left(\frac{1}{\pi}\Delta\theta_{k(x)}\right) \quad (2)$$

where $\Delta\theta_{k(x)}$ is defined as the unwrapped phase corresponding to baseline $k(x)$, acos ( ) represents the arc cosine function, $$\{\Delta\theta_{k(x)}\} = \frac{\Delta\phi_{k(x)} + m \cdot 2\pi}{2k(x)}; m = 0, k(x) - 1 \quad (3)$$

and m is some integer. Since there are many values of m that satisfy Equation 2, one objective of this invention is to determine the unambiguous $\Delta\theta_{k(x)}$ to extract the angle of arrival å.

When $k(x)$ is a multiple of 1/2, the above equation has exactly $2k(x)$ solutions for $\Delta\theta_{k(x)}$. If $k(x)$ is not a multiple of 1/2, at some angles å, this equation has $[2k(x)]+1$ solutions, at some other angles it has $[2k(x)]$ solutions, where $[x]$ denotes the smallest integer that is larger or equal to x. Therefore, in order to avoid unnecessary ambiguity, the baseline factors $k(x)$ should be chosen as multiples of 1/2 for all baselines.

Figure 2:
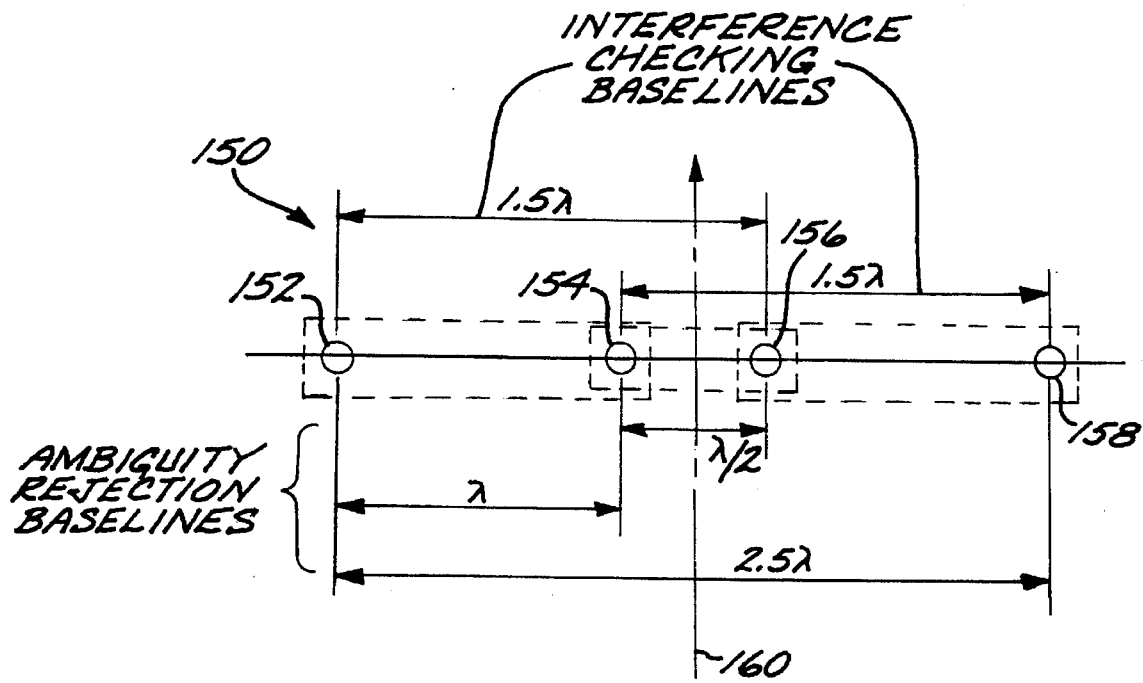
FIG. 2 illustrates an exemplary embodiment of an antenna array with several baselines for AOA detection.

FIG. 2 illustrates an exemplary antenna array 150 comprising elements 152, 154, 156 and 158. Several baselines are illustrated. Elements 154 and 156 are separated by a distance of λ/2 to form a first baseline with factor $k(1)=1/2$. Elements 152 and 154 are separated by a distance of λ to form a second baseline with factor $k(2)=1$. Elements 152 and 156 are separated by a distance of 1.5 λ to form a third baseline with factor $k(3)=3/2$. Elements 154 and 158 are separated by a distance of 1.5 λ to form a fourth baseline with factor $k(4)=3/2$. Elements 152 and 158 are separated by a distance of 2.5 λ to form a fifth baseline with factor $k(5)=5/2$.

Figure 3A:
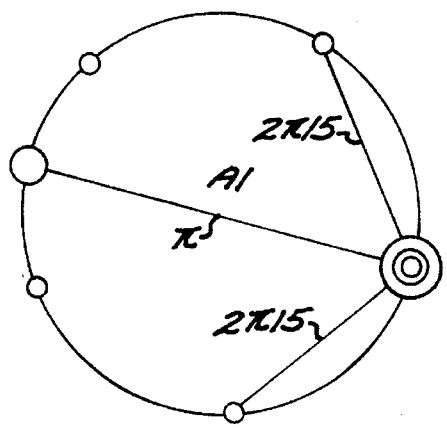
FIG. 3A illustrates the AOA ambiguity structure for the antenna array of FIG. 2 for a first selected group of baselines.
Figure 3B:
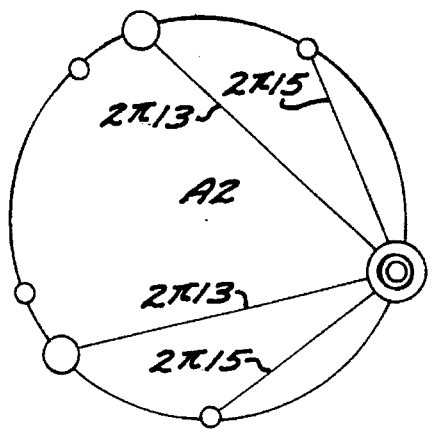
FIG. 3B illustrates the AOA ambiguity structure for the antenna array of FIG. 2 for a second selected group of baselines.

FIG. 3A illustrates the ambiguity structure for the antenna 150 using a first selected group of baselines. FIG. 3B illustrates the ambiguity structure for the antenna 150 using a second selected group of baselines. For a baseline factor $k(x)$ that is a multiple of 1/2, the $2k(x)$ solutions for $\Delta\theta_{k(x)}$ are located uniformly on a unit circle. These phases are spaced by $(2\pi/2k(x))$. To completely avoid ambiguity, the smallest baseline factor must be selected as $k(1)=1/2$.

The largest baseline should be selected based on the phase error at the antenna elements that provides the required AOA accuracy. If the largest baseline factor is much larger than 1, intermediate baselines must be selected to eliminate ambiguities and the phase error. As shown in FIG. 3A and 3B, the two AOA candidate groups of baselines for the array 150 both have 1/2 and 5/2 baselines, but the intermediate baseline factor $k(2)=1$ (FIG. 3A) yields an ambiguity distance of $\pi$, compared to $2\pi/3$ for the baseline factor $k(2)=3/2$ (FIG.3B). Hence, the selected group of baselines illustrated in FIG. 3A has lower phase unwrapping ambiguity than the selected group of baselines illustrated in FIG. 3B.

Figure 4:
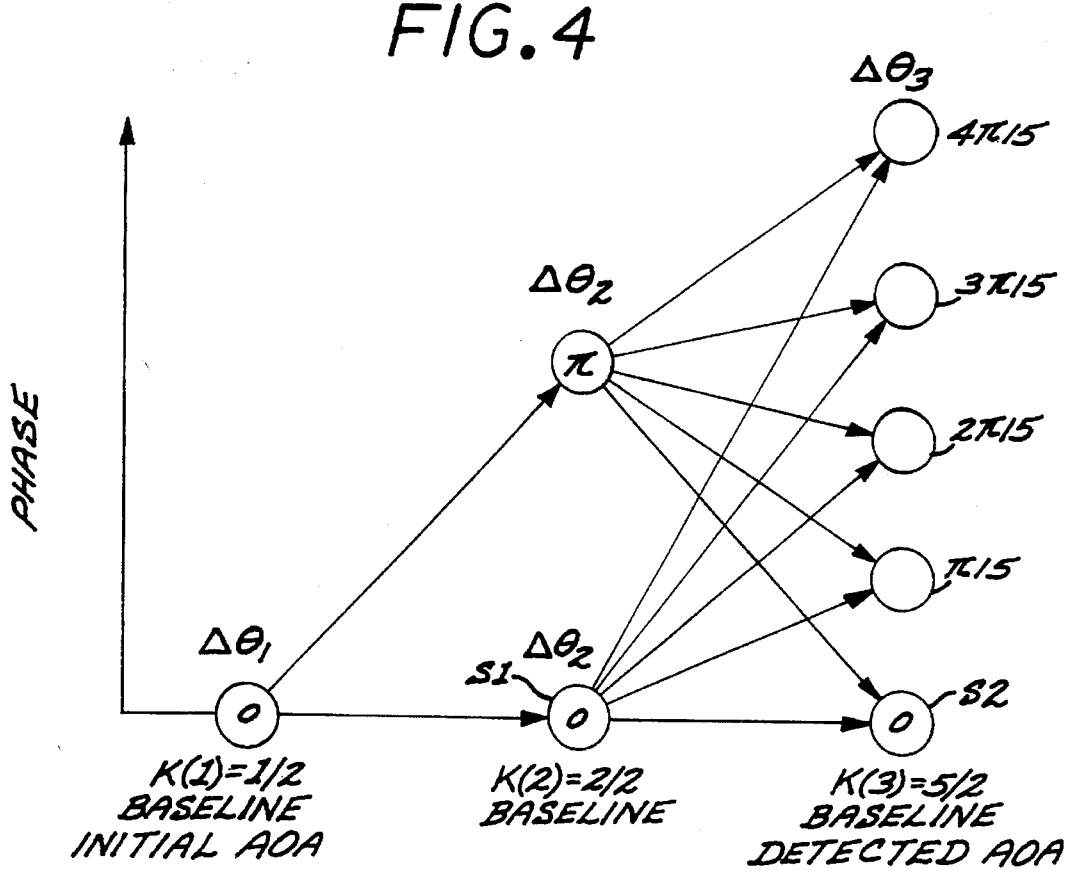
FIG. 4 illustrates the trellis search conducted in accordance with the invention for the antenna array of FIG. 2.

FIG. 4 illustrates a trellis search in accordance with the invention to determine the correct unwrapped AOA phase. This search exploits the structure of the phase ambiguities and maximizes the detection performance. This technique searches for the shortest path from the smallest baseline, to the intermediate baselines, and finally to the largest baseline. Thus, in the example shown in FIG. 4, the shortest baseline has the baseline factor $k(1)=1/2$, and has only one solution for $\Delta\theta_1$. The intermediate baseline has the baseline factor $k(2)=2/2$, and there are two possible solutions of $\Delta\theta_2$. That solution having the shortest path from the next smaller baseline is selected as the solution, i.e., solution S1. The largest baseline has factor $k(3)=5/2$, and has five possible solutions for $\Delta\theta_3$. Here again, that solution having the shortest path from a solution for the next smaller baseline is selected as the solution for the third baseline, i.e., solution S2. The process for determining the angle of arrival is as follows:

1. The signals received from the antenna elements are processed to provide the phases $\Delta\phi_{k(1)}, \Delta\phi_{k(2)} \ldots \Delta\phi_{k(n)}$.
2. Start with the smallest baseline $k(1)=1/2$, and compute $\Delta\theta_{k(1)} = (\Delta\phi(1)/2k(1)) = \Delta\phi_{k(1)}$.
3. From baseline 2 to baseline n, the process is recursive, and the process iteratively performs the following:
Based on the detected $\Delta\theta_{k(x-1)}$, find $\Delta\theta_{k(x)}$ $$\Delta\theta_{k(x)} = \frac{\Delta\phi_{k(x)} + m \cdot 2\pi}{2k(x)} \quad (4)$$

such that $$d_{k(x-1);k(x),m} = |\{\Delta\theta_{k(x-1)} - \Delta\theta_{k(x)}\}_{mod(-\pi,\pi)}| \quad (5)$$

is minimum, where m is an integer, $m=0, \ldots, 2k(x)-1$.

3. The solution of $\Delta\theta_{k(x)}$ can be found by searching. A simple equation can be used to evaluate $\Delta\theta_{k(x)}$ as follows:

A. Compute $m_{k(x)}$=nearest int $\{k(x)\alpha(x)/\pi\}$; (6)

where $$\alpha(x) = \{(\Delta\theta_{k(x)}/2k(x)) - \Delta\theta_{k(x-1)}\}_{mod(-\pi,\pi)}. \quad (7)$$

B. Compute $$\Delta\theta_{k(x)} = \frac{\Delta\phi_{k(x)} + m_{k(x)} \cdot 2\pi}{2k(x)} \quad (8)$$

4. This process continues until the largest baseline $k(n)$, and the solution of $\Delta\theta_{k(n)}$ is obtained.

For practical DF antennas where the AOA of interest is usually between 30° to 150°, the unwrapped phase of the largest baseline is used to determine the angle å of the detection signal.

$$\dot{a} = a\cos\left(\frac{1}{\pi}\Delta\theta_{k(n)}\right) \quad (9)$$

For antennas with a wide main lobe that is used to detect end-fire signal direction (å≈0° or å≈180°), a special AOA unwrapping is needed. This is discussed hereinbelow.

Figure 5:
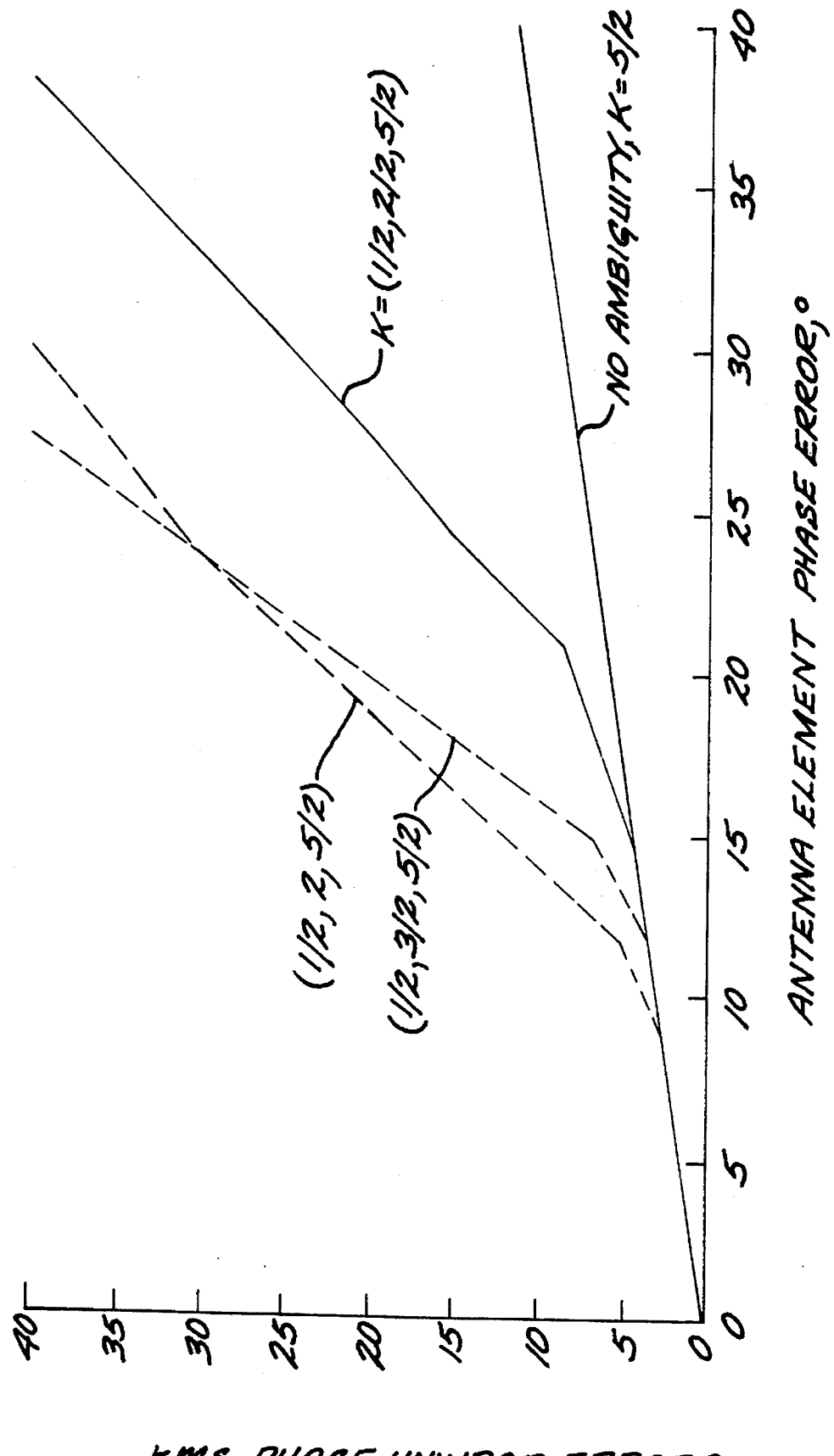
FIG. 5 shows the rms of the unwrapped phase error for an exemplary DF antenna with three baselines as functions of the antenna element rms phase noise.

FIG. 5 shows the rms of the unwrapped phase error for an exemplary DF antenna with three baselines as functions of the antenna element rms phase noise. As the rms phase noise increase, the unwrapped AOA phase error increases. But as the rms phase noise exceeds a threshold, the AOA unwrapped phase error increases at a higher rate. This is due to the ambiguous AOA unwrapping. The threshold on the DF antenna (1/2, 2/2, 5/2) is 20°, while the thresholds on the DF antenna (1/2, 3/2, 5/2 and 1/2, 2, 5/2) are 15° and 10°, respectively Thus the baseline k=(1/2, 2/2, 5/2) should be selected.

Figure 6:
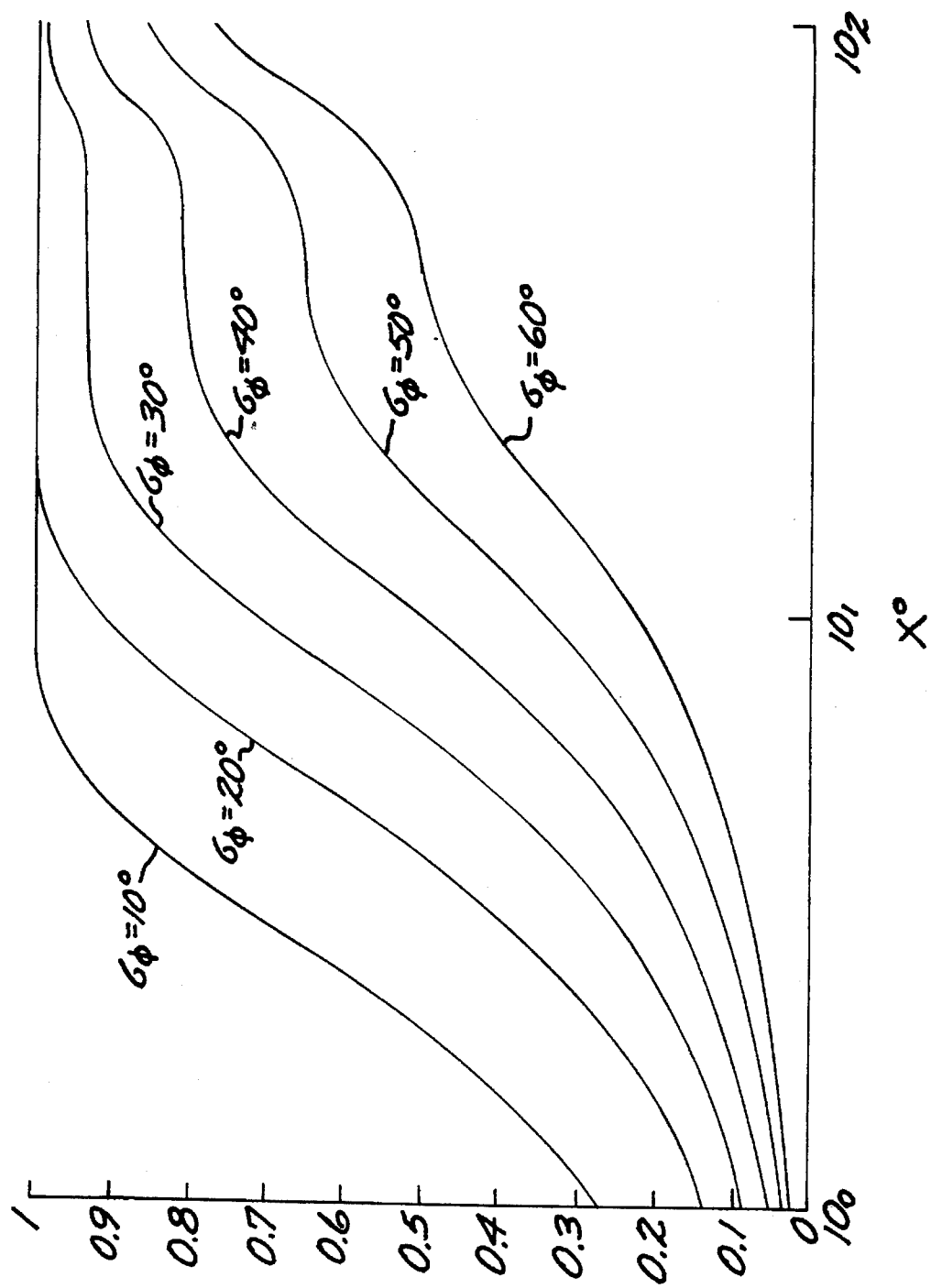
FIG. 6 shows the cumulative distribution function of the phase error for various antenna rms phase errors.
Figure 7:
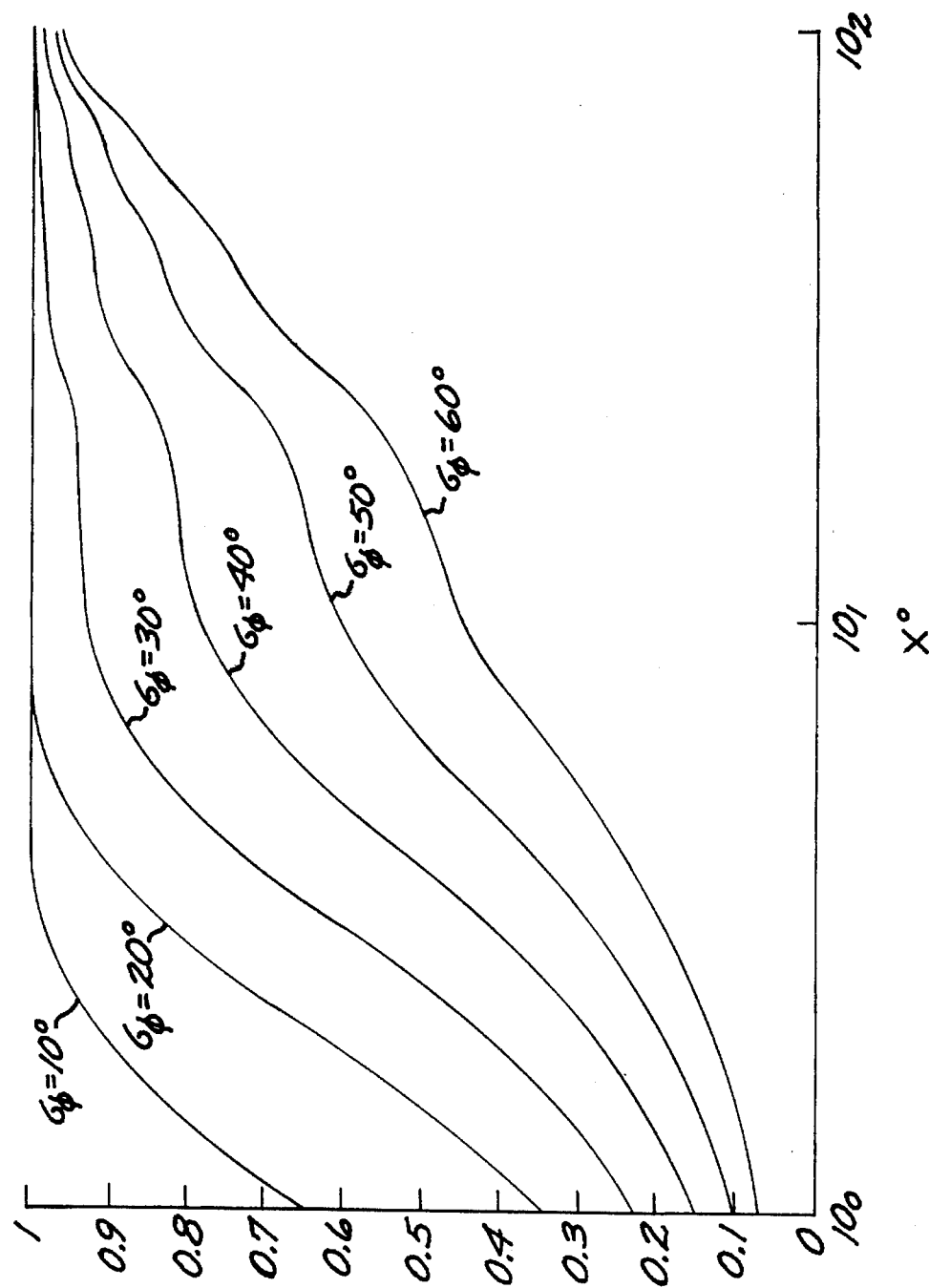
FIG. 7 shows the cumulative distribution function of the AOA error for various antenna rms phase errors.

A detailed performance of an exemplary DF antenna with baseline factors 1/2, 2/2, 5/2 is shown in FIGS. 6 and 7 as a function of various antenna rms phase errors (with Guassian distribution). When the rms phase error is 30°, the AOA phase is unwrapped unambiguously with 94% probability.

The AOA can be unwrapped correctly or with low error, but this does not guarantee a correct AOA detection when the AOA is at about the end-fire (baseline axis). When the detected $\Delta\theta_{k(n)}$ is about 180° or −180° this unwrapped phase yields two solutions of å, å≈0° or å≈180°

This is not a common problem, since practical DF antenna elements have main lobe covering about 120°, and the AOA of interest is between 30° to 150°. Thus, the above problem is not normally encountered. Nevertheless, if a wide angle antenna array needs to detect AOA from 0° to 180°, a checking baseline with a factor less than 1/2 (e.g., k(c)=1/4) should be used to test the direction of the AOA. The following procedure is used.

If $|\Delta\theta_{k(n)}-\pi| \leq T_1$, compute $\Delta\theta_{k(m)}$

If $\Delta\theta_{k(c)}$ is $\geq 0$, å=0

If $\Delta\theta_{k(c)}$ is <0, å=π where $T_1$ is some threshold based on the signal-to-noise ratio, and k(c) is the factor of the checking baseline.

If $|\Delta\theta_{k(n)}-\pi|>T_1$, the AOA can be computed based on the unwrapped phase of the largest baseline, $$\mathring{a} = a\cos\left(\frac{1}{\pi}\Delta\theta_{k(n)}\right) \quad (10)$$

Figure 8:
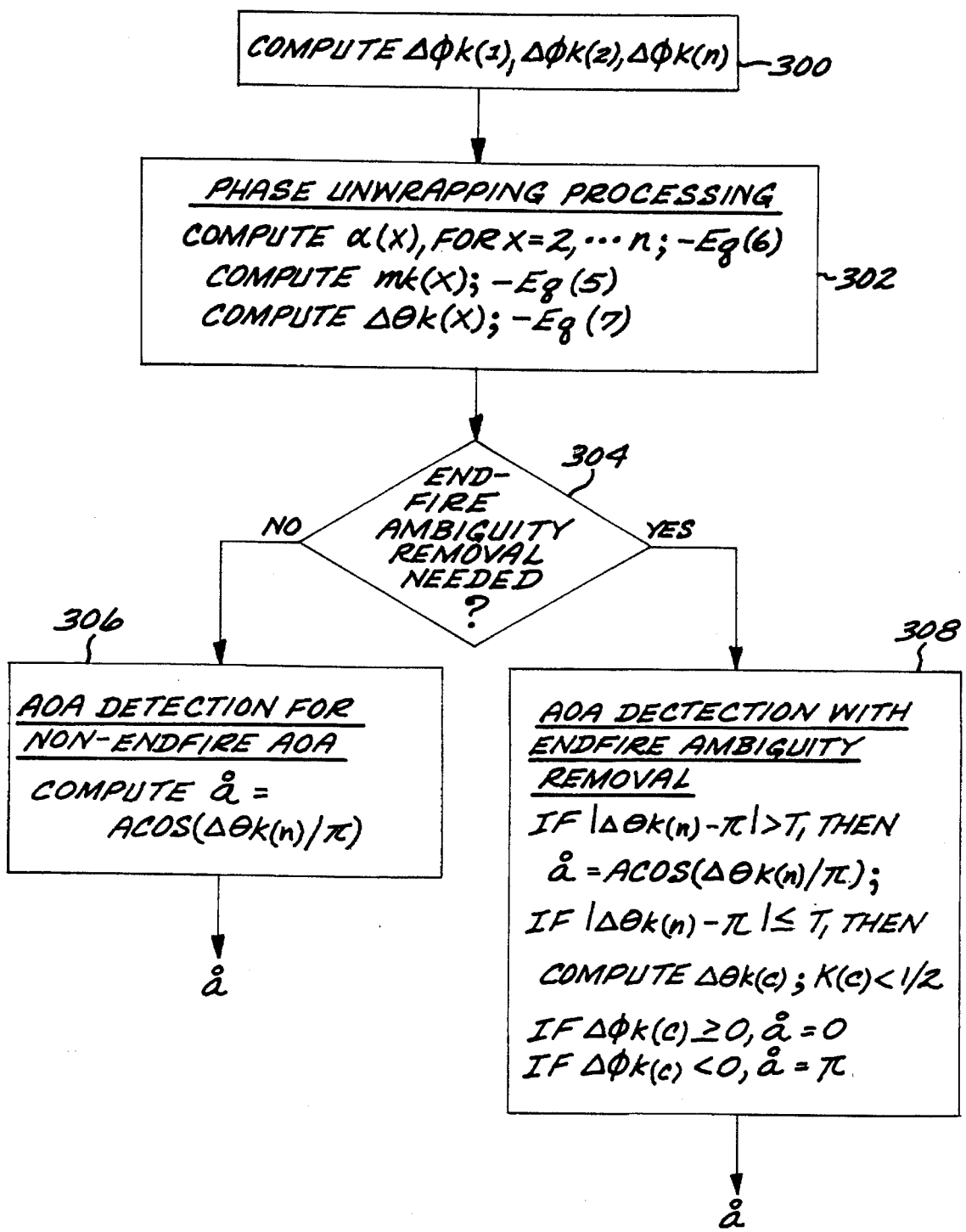
FIG. 8 is a process flow diagram illustrating the method of determining the angle of arrival in accordance with the invention.

FIG. 8 is a simplified flow diagram illustrating a process for determining the angle of arrival in accordance with the invention. At step 300, the signals from the antenna elements are processed to determine the $\Delta\phi_{k(n)}$ values for the n baselines. The phase unwrapping processing is carried out at step 302. Using equation 6, the values for α(x) are computed for x=2 . . . n. From these values, $m_{k(x)}$ is computed. Then, using equation 7, the phase values $\Delta\theta_{k(n)}$ are computed.

Step 304 is a decision point, to determine whether end fire ambiguity removal is necessary. If not, the processing proceeds to step 306 to compute the AOA å=acos ($\theta_{k(n)}$)/π, where k(n) is the baseline factor corresponding to the longest baseline.

Alternatively, if end-fire ambiguity removal is needed, the processing proceeds to step 308 to determine the AOA based on the following process.

If $|\Delta\theta_{k(n)}-\pi|>T_1$, the AOA can be computed based on the unwrapped phase of the largest baseline, using equation 8. If $|\Delta\theta_{k(n)}-\pi| \leq T_1$, compute $\Delta\theta_{k(m)}$ as follows:

If $\Delta\theta_{k(c)}$ is $\geq 0$, å=0

If $\Delta\theta_{k(c)}$ is <0, å=π where k(c) is the factor of the checking baseline.

Figure 9:
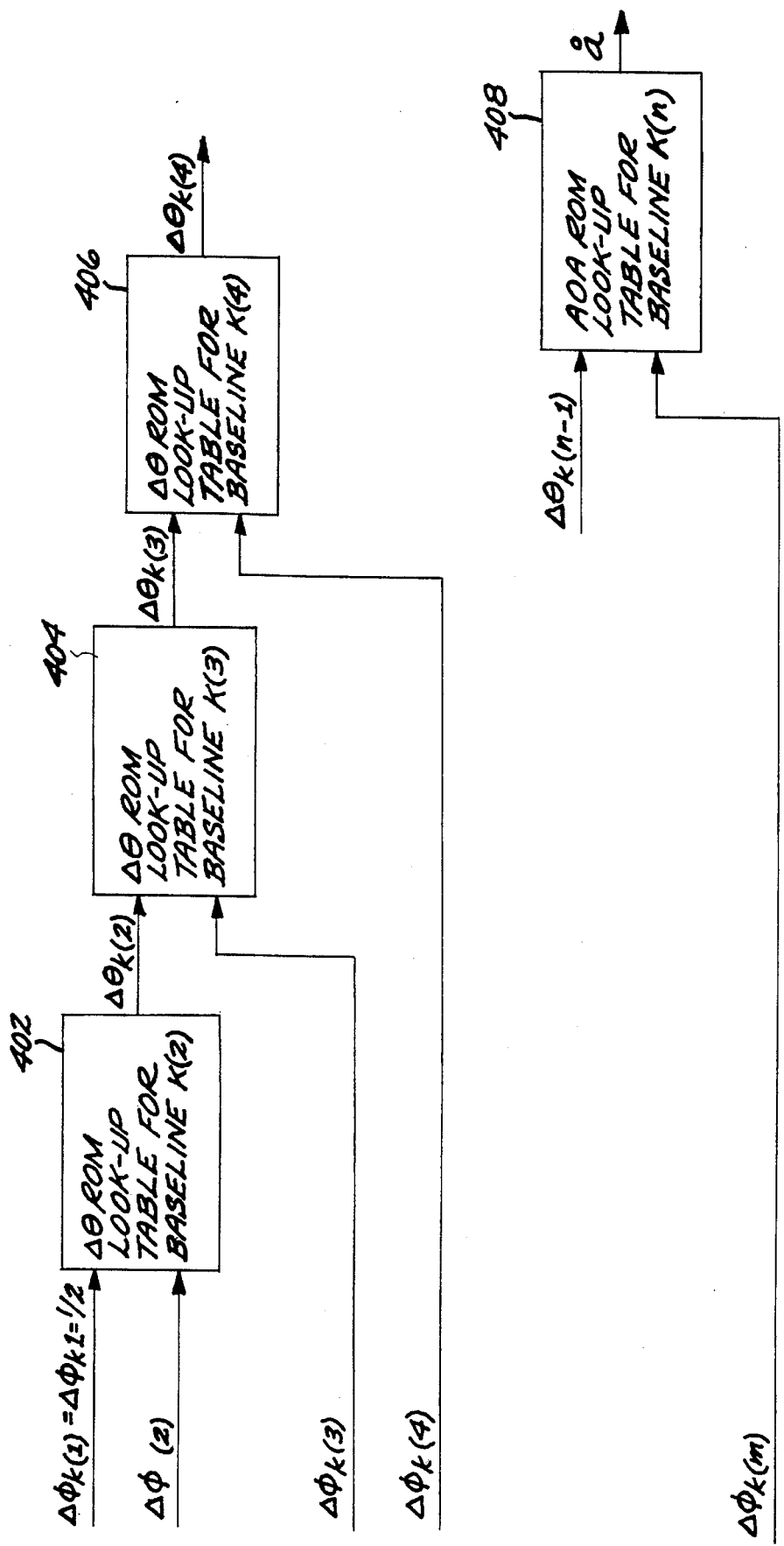
FIG. 9 illustrates a look-up table implementation of the technique for calculating the angle of arrival.

In a practical implementation, the computations illustrated in FIG. 8 could, instead of being computed in real time, be pre-computed for a set of typical parameter values and stored in a look-up table. FIG. 9 illustrates a process flow diagram of such an implementation, with n baselines and n−1 ROM lookup tables. Since $\Delta\theta_{k(1)}$ has only one solution,=$\Delta\phi_{k(1)=1/2}$, no lookup table is needed to compute this delta theta value. This $\Delta\theta_{k(1)}$ value is used as one parameter to access the Δθ ROM lookup table 402 for the baseline of factor k(2). The other value used as a parameter to access the table 402 is $\Delta\phi_{k(2)}$. These two parameters define an address of the table 402, which outputs in response a corresponding value $\Delta\theta_{k(2)}$. Similarly, this theta value for the baseline k(2) is used as one parameter for the next Δθ ROM table 404 for baseline k(3); the value $\Delta\phi_{k(3)}$ is the other parameter value. These parameters determine an address for ROM table 404 which outputs in response a corresponding value $\Delta\theta_{k(3)}$. This delta theta value for the baseline k(3) is used as one parameter for the next Δθ ROM table 406 for baseline k(4). With $\Delta\phi_{k(4)}$ also serving to define the address of table 406 to be accessed, a value $\Delta\theta_{k(4)}$ is output from the table. This serves as part of the address for the lookup table for the next largest baseline, and so on, until the largest baseline k(n) is processed by lookup table 408. Values $\Delta\theta_{k(n-1)}$ and $\Delta\phi_{k(n)}$ define the address for the AOA value å.

Figure 10:
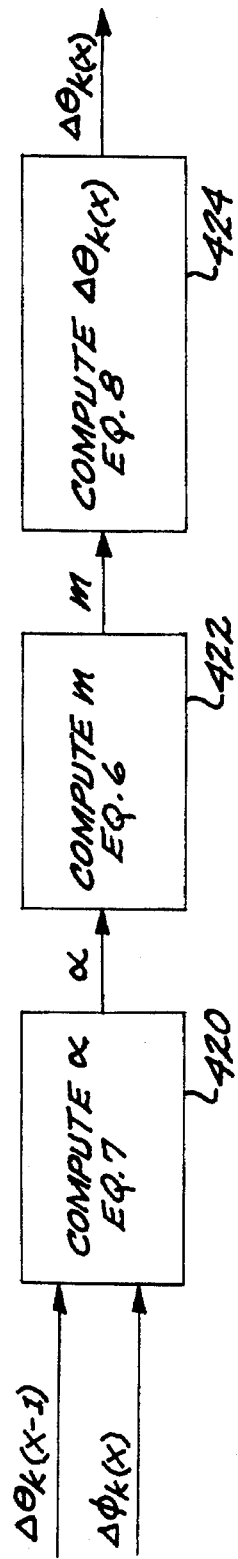
FIG. 10 shows the processing steps used to determine the $\Delta\theta$ ROM lookup table values for baselines $k(2) \ldots k(n-1)$.

FIG. 10 shows the processing steps used to determine the Δθ ROM lookup table values $\Delta\theta_{k(x)}$ for baselines k(2) . . . , k(n−1) for a particular set of parameters $\Delta\theta_{k(x-1)}$ and $\Delta\phi_{k(x)}$. At step 420, the value for α is determined using equation 6, for a particular set of values $\Delta\theta_{k(x-1)}$ and $\Delta\phi_{k(x)}$. This value represents the angle that produces the phase difference value given the two baselines k(x−1) and k(x). An exemplary table of values for α for different values of the two parameters is shown in FIG. 12.

Next, at step 422, the computed value for α is in turn used to compute m, with equation 5. FIG. 13 shows a table of values computed for m from different baseline k(1)=1/2 and k(2)=2/2 values. Finally, from this value for m, $\Delta\theta_{k(x)}$ is computed at step 424 using equation 7. FIG. 14 is a table of values of $\Delta\theta_{k(x)}$ computed for various exemplary values of measurements of the Δφ for the k(1)=1/2 and k(2)=2/2 baselines. Note that all the values in the table are between −180 degrees and +180 degrees.

Figure 11:
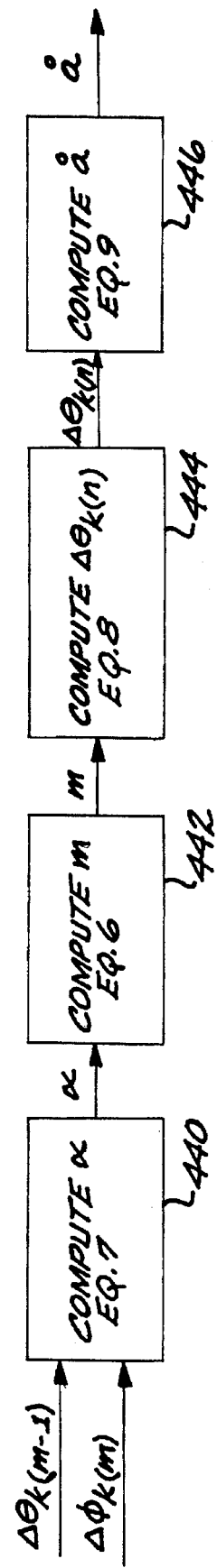
FIG. 11 shows the processing steps used to determine the AOA ROM lookup table values for the AOA.

FIG. 11 shows the processing steps used to determine the AOA ROM lookup table values for the AOA å. The technique for computing the AΘ ROM lookup table values except that the AOA table outputs the computed AOA å instead of Δθ. Thus, for values $\Delta\theta_{k(n-1)}$ and $\Delta\phi_{k(n)}$, values of α and m are computed (steps 440 and 442) as in FIG. 10. At step 444, $\Delta\theta_{k(n)}$ using equation 7 from the computed value for m, and this value is then used (step 446) to compute the corresponding value for the AOA å using equation 8. FIG. 15 is a table of spatial AOA values computed from the measurements of the baselines k(1)=1/2 and k(2)=2/2, where the k(2) baseline is the largest used in the system.

Figure 16:
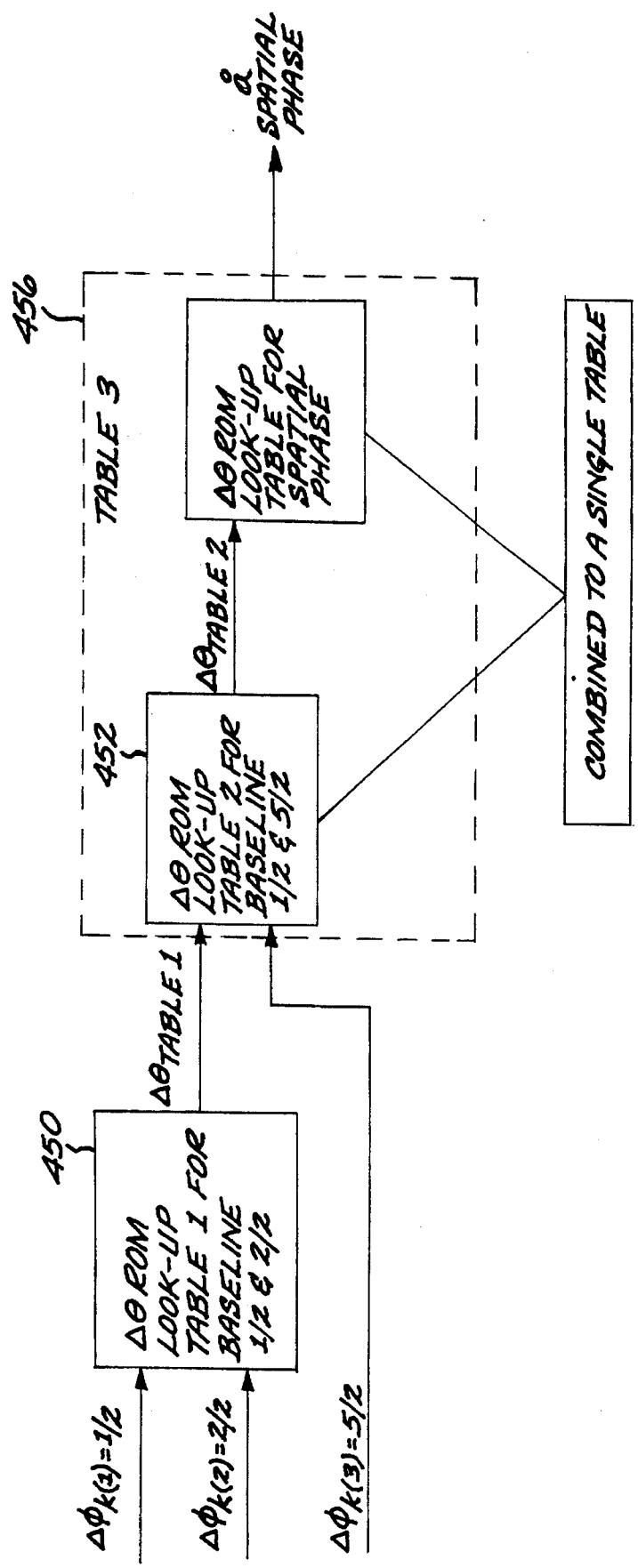
FIG. 16 is a processing flow diagram showing an lookup table implementation of the technique for calculating the AOA for specific baseline values.

The following is a description of the use of lookup tables for the determination of the spatial AOA from an exemplary antenna array having baselines k(1)=1/2, k(2)=2/2, and k(3)=5/2. The process of determining the AOA from the baseline Δφ data is illustrated in FIG. 16.

The process commences with the antenna measurement of the Δφ measurements of the baselines k(1) and k(2), $\Delta\phi_{k(1)=1/2}$ and $\Delta\phi_{k(1)=2/2}$. These two values are used to address a Δφ ROM lookup table 450. Exemplary values for the ROM lookup table 450 are shown in FIG. 17. The $\Delta\phi_{k(1)=1/2}$ baseline value is used to select the row in the lookup table 450, and the $\Delta\phi_{k(2)=2/2}$ baseline value is used to select the column. If the input is noise and interference free, the output of the table 450 will be the same as for the baseline k(1) value ($\Delta\phi_{k(1)}$). For a numeric example, an input of $\Delta\phi_{k(1)}$=40 and $\phi_{k(1)}$=80 has a $\Delta\theta_{Table\ 1}$ value=40. When noise or interference is introduced in the measurement, the table lookup values, calculated as defined in equations 4, 5, 6 and 7, minimize errors in the unwrap processing.

The output from ROM table 450 is then used, with the $\Delta\phi_{k(3)=5/2}$ measurement, as the inputs to the second ROM table 452 to find $\Delta\theta_{k(3)=5/2}$. An exemplary table 452 with a set of example values is shown in FIG. 18. Again, if the input is noise and interference free, the output of table 452 will be the same as the $\Delta\phi_{k(1)=1/2}$ measurement. In this exemplary case, the $\Delta\theta_{Table\ 1}$ value=40 k(1) measurement is combined with a $\Delta\phi_{k(3)}$=100 value, resulting in a table 452 output value of $\Delta\phi_{Table\ 2}$=40.

The Δθ calculations must now be converted to a spatial angle as the next step in the process. In practice, these functions can be combined with the second lookup table 452 and a new table, table 456, replaces table 452. The table 456 combines the table 450 lookup value and the baseline k(3)

measurement ($\Delta\phi_{k(3)}$), and also performs an ARC cosine computation with the values in the table 456 being the spatial angle. FIG. 19 shows an exemplary table 456 with a sample set of values. Again the example case starts with the k(1) baseline measurement value $\Delta\phi_{k(1)}$=40 and the k(2) baseline measurement value $\Delta\phi_{k(2)}$=80, and table 450 generates a $\Delta\theta_{Table\ 2}$ value=40. This value is combined with a k(3) baseline measurement value $\Delta\phi_{k(3)}$ value=100 in Table 456 and the spatial angle of 83.6 degrees is found.

The subject invention has particular utility in a transmitter location detection system described in copending, commonly assigned application Ser. No. 08/443,519, filed concurrently herewith, entitled "Vehicle Position Tracking Technique," by K. V. Cai and R. J. O'Connor, Attorney Docket No. PD-94258, the entire contents of which are incorporated herein by this reference. The processor functions 110A and 110B of processor 100 shown in FIG. 2 of this co-pending application can be performed by use of the subject invention. FIG. 5 of the co-pending application illustrates a receiver structure which can be used to route array element signals through analog elements to an analog-to-digital conversion prior to input to a digital processing to carry out the process steps described above.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for detecting angle of arrival of an RF signal incident at an antenna array comprising a plurality of spaced receiving elements, the method comprising:

collecting the signals received at the plurality of spaced antenna elements;

processing the signals received at the plurality of elements to determine, for N different baseline pairs of said elements, a measured phase difference $\Delta\phi_{k(x)}$ in the signals received at the two elements comprising each baseline pair, thereby providing a measured phase difference value for each baseline element pair, wherein one or more of said measured phase difference values is in the range from 0 degrees to 360 degrees and is subject to ambiguities such that the actual phase difference may be m times said measured phase difference value;

wherein each of said baseline pairs of elements is spaced by a distance d, and the distances d are different for each baseline pair, and the N baselines are characterized by baseline factors k(x)=the ratio of the spacing d to the signal wavelength, x=1, . . . N, and wherein the first baseline pair of factor k(1) has the smallest spacing distance d and the corresponding phase difference value indicates the angle of arrival (AOA) of the RF signal in relation to the antenna array with least accuracy and least ambiguity of all the baseline pairs, and the Nth baseline pair of factor k(N) has the largest spacing distance d and the corresponding phase difference value indicates the AOA with highest accuracy and greatest ambiguity of all the baseline pairs;

processing the phase difference values $\Delta\phi_{k(x)}$ for each baseline element pair using a trellis search process to determine with low ambiguity the angle of arrival (AOA) of said RF signal in relation to the antenna array, including (i) determining an unwrapped phase shift value $\Delta\theta_{k(1)}$ for said first baseline pair having a factor k(1) with least ambiguity, (ii) for each successive baseline of factor k(1+i), i=1 to N−1, using said unwrapped phase shift value $\Delta\theta_{k(i)}$ for said baseline pair having factor k(i) to determine an unwrapped phase shift value $\Delta\theta_{k(i+1)}$ for said baseline pair having factor k(1+i), thereby resolving ambiguity in said phase shift values for baselines of factors k(i+1), and (iii) converting the unwrapped phase shift value $\Delta\theta_{k(N)}$ for said baseline of factor k(N) into an AOA.

2. The method of claim 1 wherein said first baseline pair of factor k(1) has an element spacing d(1) equal to one half the wavelength ($\lambda$) of said RF signal, so that said phase shift value measured for said first baseline has zero nominal ambiguity, and the other N−1 baseline pairs of antenna elements have element spacings d equal to different multiples of $\lambda/2$.

3. The method of claim 2 wherein said unwrapped phase shift value for said first baseline pair of factor k(1)=1/2 is equal to said measured phase shift value for said first baseline pair.

4. The method of claim 1 wherein said step of converting said unwrapped phase shift value into an AOA includes the step of calculating the AOA $\hat{a}$ $$\hat{a} = a\cos\left(\frac{1}{\pi}\Delta\theta_{k(n)}\right).$$

5. The method of claim 1 wherein said step of determining an unwrapped phase shift value $\Delta\theta_{k(1+i)}$ includes finding $\Delta\theta_{k(x)}$ $$\Delta\theta_{k(x)} = \frac{\Delta\phi_{k(x)} + m \cdot 2\pi}{2k(x)}$$

such that $$d_{k(x-1);k(x),m} = |\{\Delta\theta_{k(x-1)} - \Delta\theta_{k(x)}\}_{mod(-\pi,\pi)}|$$

is minimum, where m is an integer, m=0, . . . , 2k(x)−1.

6. The method of claim 5 wherein said step of determining said unwrapped phase shift value $\Delta\theta_{k(1+i)}$ includes the steps of A) computing $m_{k(x)}$=−nearest int $\{k(x)\alpha(x)/\pi\}$; where $\alpha(x) = \{(\Delta\phi_{k(x)}/2k(x)) - \Delta\theta_{k(x-1)}\}_{mod(-\pi,\pi)}$, and B) computing $$\Delta\theta_{k(x)} = \frac{\Delta\phi_{k(x)} + m_{k(x)} \cdot 2\pi}{2k(x)}.$$

7. The method of claim 1 wherein said array elements are disposed along a linear array axis, said array further includes a checking baseline having a factor k(c) less than 1/2, and said processing of said phase difference values to compute an AOA $\hat{a}$ includes the following processing steps:

If $|\Delta\theta_{k(n)} - \pi| \leq T_1$, compute $\Delta\theta_{k(m)}$

If $\Delta\theta_{k(c)}$ is $\geq 0$, $\hat{a}=0$

If $\Delta\theta_{k(c)}$ is $<0$, $\hat{a}=\pi$ where $T_1$ is a threshold based on a signal-to-noise ratio; and if $|\Delta\theta_{k(n)} - \pi| > T_1$, computing the AOA based on the unwrapped phase of the largest baseline, $$\hat{a} = a\cos\left(\frac{1}{\pi}\Delta\theta_{k(n)}\right).$$

8. The method of claim 1 wherein said array is characterized in that no single array element is used in each of said plurality of baseline pairs.

9. A system for detecting angle of arrival of an RF signal incident at an antenna array, the system comprising:

an antenna array comprising a plurality of separated antenna elements, said elements arranged to provide N different baseline pairs of elements;

means for collecting the signals received at the plurality of spaced antenna elements;

means responsive to the received signals from the plurality of antenna elements for determining, for N different baseline pairs of said elements, a measured phase difference $\Delta\phi_{k(x)}$ in the signals received at the two elements comprising each baseline pair, thereby providing a measured phase difference value for each baseline element pair, wherein one or more of said measured phase difference values is in the range from 0 degrees to 360 degrees and is subject to ambiguities such that the actual phase difference may be m times said measured phase difference value;

wherein each of said baseline pairs of elements is spaced by a distance d, and the distances d are different for each baseline pair, and the N baselines are characterized by baseline factors k(x)=the ratio of the spacing d to the signal wavelength, x=1, . . . N, and wherein the first baseline pair of factor k(1) has the smallest spacing distance d and the corresponding phase difference value indicates the angle of arrival (AOA) of the RF signal in relation to the antenna array with least accuracy and least ambiguity of all the baseline pairs, and the Nth baseline pair of factor k(N) has the largest spacing distance d and the corresponding phase difference value indicates the AOA with highest accuracy and greatest ambiguity of all the baseline pairs;

processing means for processing the phase difference values $\Delta\phi_{k(x)}$ for each baseline element pair using a trellis search process to determine with low ambiguity the angle of arrival (AOA) of said RF signal in relation to the antenna array, including (i) means for determining an unwrapped phase shift value $\Delta\theta_{k(1)}$ for said first baseline pair having a factor k(1) with least ambiguity, (ii) means for determining, for each successive baseline of factor k(1+i), i=1 to N−1, using said unwrapped phase shift value $\Delta\theta_{k(i)}$ for said baseline pair having factor k(i), an unwrapped phase shift value $\Delta\theta_{k(i+1)}$ for said baseline pair having factor k(1+i), thereby resolving ambiguity in said phase shift values for baselines of factors k(i+1), and (iii) means for converting the unwrapped phase shift value $\Delta\theta_{k(N)}$ for said baseline of factor k(N) into an AOA.

10. The system of claim 9 wherein said first baseline pair of factor k(1) has an element spacing d(1) equal to one half the wavelength (λ) of said RF signal, so that said phase shift value measured for said first baseline has zero nominal ambiguity, and the other N−1 baseline pairs of antenna elements have element spacings d equal to different multiples of λ/2.

11. The system of claim 10 wherein said unwrapped phase shift value for said first baseline pair of factor k(1)=1/2 is equal to said measured phase shift value for said first baseline pair.

12. The system of claim 9 wherein said means for converting said unwrapped phase shift value into an AOA means for calculating the AOA â

$$\hat{a} = a\cos\left(\frac{1}{\pi}\Delta\theta_{k(n)}\right).$$

13. The system of claim 9 wherein said means for determining an unwrapped phase shift value $\Delta\theta_{k(1+i)}$ includes means for finding $\Delta\theta_{k(x)}$ $$\Delta\theta_{k(x)} = \frac{\Delta\phi_{k(x)} + m \cdot 2\pi}{2k(x)}$$

such that $$d_{k(x-1;k(x),m} = |\{\Delta\theta_{k(x-1)} - \Delta\theta_{k(x)}\}_{mod(-\pi,\pi)}|$$

is minimum, where m is an integer, m=0, . . . , 2k(x)−1.

14. The system of claim 13 wherein said means for determining said unwrapped phase shift value $\Delta\theta_{k(1+i)}$ includes means for A. computing $m_{k(x)}$=−nearest int $\{k(x)\alpha(x)/\pi\}$; where $\alpha(x) = \{(\Delta\phi_{k(x)}/2k(x)) - \Delta\theta_{k(x-1)}\}_{mod\ (-\pi,\pi)}$, and B) computing $$\Delta\theta_{k(x)} = \frac{\Delta\phi_{k(x)} + m_{k(x)} \cdot 2\pi}{2k(x)}.$$

15. The system of claim 9 wherein said array elements are disposed along a linear array axis, said array further includes a checking baseline having a factor k(c) less than 1/2, and wherein said means for processing said phase difference values to compute an AOA â includes means for carrying out the following algorithm:

If $|\Delta\theta_{k(n)} - \pi| \leq T_1$, compute $\Delta\theta_{k(m)}$

If $\Delta\theta_{k(c)}$ is $\geq 0$, â=0

If $\Delta\theta_{k(c)}$ is <0, â=π where $T_1$ is a threshold based on a signal-to-noise ratio; and

If $|\Delta\theta_{k(n)} - \pi| > T_1$, computing the AOA based on the unwrapped phase of the largest baseline, $$\hat{a} = a\cos\left(\frac{1}{\pi}\Delta\theta_{k(n)}\right).$$

16. The system of claim 9 wherein said array is characterized in that no single array element is used in each of said plurality of baseline pairs.

* * * * *